United States Patent
Aron et al.

(10) Patent No.: US 9,519,884 B2
(45) Date of Patent: Dec. 13, 2016

(54) DATA DRIVEN DYNAMIC WORKFLOW

(75) Inventors: Melissa Aron, Tampa, FL (US); Michael A. Blocksome, Rosedale, MD (US); David G. Herbeck, Rochester, MN (US); Todd E. Johnson, Chatfield, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 527 days.

(21) Appl. No.: 13/404,841

(22) Filed: Feb. 24, 2012

(65) Prior Publication Data
US 2012/0159491 A1    Jun. 21, 2012

Related U.S. Application Data

(62) Division of application No. 11/100,963, filed on Apr. 7, 2005, now Pat. No. 8,140,373.

(51) Int. Cl.
*G06Q 10/10* (2012.01)
*G06Q 10/06* (2012.01)

(52) U.S. Cl.
CPC .......... *G06Q 10/10* (2013.01); *G06Q 10/0633* (2013.01); *G06Q 10/06316* (2013.01)

(58) Field of Classification Search
CPC .......... G06Q 10/00; G06Q 40/00; G06F 17/60
USPC ...................................................... 705/7.27
See application file for complete search history.

(56) References Cited

U.S. PATENT DOCUMENTS

| | | | |
|---|---|---|---|
| 5,734,837 A | 3/1998 | Flores et al. | |
| 6,151,583 A * | 11/2000 | Ohmura ................ | G06Q 10/10 705/7.26 |
| 6,609,184 B2 | 8/2003 | Bradshaw et al. | |
| 6,904,161 B1 | 6/2005 | Becker et al. | |
| 6,986,138 B1 * | 1/2006 | Sakaguchi ............ | G06Q 10/10 705/7.27 |
| 7,242,991 B2 | 7/2007 | Budinger et al. | |

(Continued)

OTHER PUBLICATIONS

Liu, Dongsheng et al, Modeling workflow processes with colored Petri nets, Computers in Industry, Dec. 2002, pp. 267-281, vol. 49, Issue 3, Elsevier Science Publishers, Amsterdam, The Netherlands.

*Primary Examiner* — Romain Jeanty
(74) *Attorney, Agent, or Firm* — Patterson + Sheridan, LLP

(57) ABSTRACT

A method, system and article of manufacture for workflow processing and, more particularly, for managing creation and execution of data driven dynamic workflows. One embodiment provides a computer-implemented method for managing execution of workflow instances. The method comprises providing a parent process template and providing a child process template. The child process template is configured to implement an arbitrary number of workflow operations for a given workflow instance, and the parent process template is configured to instantiate child processes on the basis of the child process template to implement a desired workflow. The method further comprises receiving a workflow configuration and instantiating an instance of the workflow on the basis of the workflow configuration. The instantiating comprises instantiating a parent process on the basis of the parent process template and instantiating, by the parent process template, one or more child processes on the basis of the child process template.

20 Claims, 8 Drawing Sheets

(56) References Cited

U.S. PATENT DOCUMENTS

| | | | |
|---|---|---|---|
| 7,337,950 B2* | 3/2008 | DeVault | 235/376 |
| 7,464,366 B2* | 12/2008 | Shukla | G06Q 10/06 705/7.27 |
| 8,140,373 B2* | 3/2012 | Aron et al. | 705/7.27 |
| 2003/0074302 A1* | 4/2003 | Cope | 705/37 |
| 2006/0229924 A1 | 10/2006 | Aron et al. | |

* cited by examiner

DATA DRIVEN DYNAMIC WORKFLOW

CROSS-REFERENCE TO RELATED APPLICATIONS

This application is a divisional of co-pending U.S. patent application Ser. No. 11/100,963, filed Apr. 5, 2005. The aforementioned related patent application is herein incorporated by reference in its entirety.

BACKGROUND OF THE INVENTION

Field of the Invention

The present invention generally relates to workflow processing and, more particularly, to creation and execution of data driven dynamic workflows.

Description of the Related Art

Workflow processing technologies typically provide application integration capabilities, enabling a series of separate software components to be run in a defined order facilitating construction of larger solutions from individual software components. Workflow implementations are typically driven from a workflow definition, commonly captured as an eXtensible Markup Language (XML) document, that identifies the order of operations to perform and data flows from one operation to another. Thus, workflow engines provide the ability to string together functionality from different applications and servers into an overriding process, i.e., a workflow.

In recent years, Integrated Development Environments (IDEs), such as Websphere Studio Application Developer Integration Edition (WSAD-IE) available from International Business Machines of Armonk, N.Y., have focused on improving user interfaces for workflow development. Such user interfaces allow users to manipulate and change workflow designs graphically and typically provide drag-and-drop features to simplify workflow development processes. Thus, users without particular programming skills may use such user interfaces to define workflows. However, complexity, performance and scalability of such workflows are generally limited compared to the potential of a workflow designed by a developer with programming skills.

Another drawback of current workflow technology is that a workflow is structurally defined during a development phase within an IDE which results in a static workflow definition. This static workflow definition can then be deployed on a server and is instantiated when used by an executing application, resulting in a unique workflow instance. Because the workflow definition is static, the definition is not amenable to changes after the initial deployment. Accordingly, difficulties arise if a deployed workflow must be changed structurally after the initial deployment or if a new, structurally different workflow is needed in addition to the deployed workflow.

More specifically, if the deployed workflow must be changed structurally after the initial deployment, an entirely new workflow must be defined to replace the original workflow as the definition of the original workflow is static. However, appropriate workflow development skills are required to use a corresponding IDE to define this new workflow. Furthermore, depending on the complexity of the original deployed workflow programming skills may be required to define the new workflow based on the original workflow. Moreover, removing the deployed workflow and deploying the new workflow may require application server skills dependent on the application environment in which the deployed/new workflow should be removed/deployed. On the other hand, if a new, structurally different workflow is needed in addition to the original deployed workflow, an underlying application that is intended to use both workflows needs to be updated to make use of both such workflows. Updating the underlying application requires the skills and knowledge necessary to perform the update. Finally, a currently executing workflow cannot be changed structurally. In this case, execution of the workflow must be terminated and a new, updated workflow must be defined and deployed on a corresponding application server. Subsequently, the work assigned to the original workflow must be sent to the new workflow for completion.

Therefore, there is a need for a more flexible technique for creating and deploying workflows and for managing execution and modification of deployed workflows.

SUMMARY OF THE INVENTION

The present invention is generally directed to a method, system and article of manufacture for workflow processing and, more particularly, for managing creation and execution of data driven dynamic workflows.

One embodiment provides a computer-implemented method for managing execution of workflow instances. The method comprises providing a parent process template and providing a child process template. The child process template is configured to implement an arbitrary number of workflow operations for a given workflow instance, and the parent process template is configured to instantiate child processes on the basis of the child process template to implement a desired workflow. The method further comprises receiving a workflow configuration and instantiating an instance of the workflow on the basis of the workflow configuration. The instantiating comprises instantiating a parent process on the basis of the parent process template and instantiating, by the parent process template, one or more child processes on the basis of the child process template.

Another embodiment provides a computer-implemented method for managing execution of workflow instances, comprising providing a parent process template, and instantiating an instance of a workflow on the basis of the parent process template and according to a first workflow configuration. The instantiating comprises executing a number of workflow operations according to the first workflow configuration. The method further comprises receiving a change request specifying a second workflow configuration. Then, the execution of the workflow operations is changed relative to the execution of the workflow operations according to the second workflow configuration.

Another embodiment provides a computer-readable medium containing a program which, when executed by a processor, performs operations for managing execution of workflow instances. The operations comprise retrieving a parent process template, and retrieving a child process template configured to implement an arbitrary number of workflow operations for a given workflow instance. The parent process template is configured to instantiate child processes on the basis of the child process template to implement a desired workflow. The operations further comprise receiving a workflow configuration, and instantiating an instance of the workflow on the basis of the workflow configuration. The instantiating comprises instantiating a parent process on the basis of the parent process template and instantiating, by the parent process template, one or more child processes on the basis of the child process template.

Another embodiment provides a computer-readable medium containing a program which, when executed by a processor, performs operations for managing execution of workflow instances. The operations comprise retrieving a parent process template, and instantiating an instance of a workflow on the basis of the parent process template and according to a first workflow configuration. The instantiating comprises executing a number of workflow operations according to the first workflow configuration. The operations further comprise receiving a change request specifying a second workflow configuration, and changing the execution of the workflow operations relative to the execution of the workflow operations according to the second workflow configuration.

Another embodiment provides a system for managing execution of workflow instances, comprising a parent process template, a child process template and a workflow environment. The child process template is configured to implement an arbitrary number of workflow operations for a given workflow instance, wherein the parent process template is configured to instantiate child processes on the basis of the child process template to implement a desired workflow. The workflow environment is configured to receive a workflow configuration, and instantiate an instance of the workflow on the basis of the workflow configuration. The instantiating comprises instantiating a parent process on the basis of the parent process template and instantiating, by the parent process template, one or more child processes on the basis of the child process template.

Still another embodiment provides a system for managing execution of workflow instances, comprising a parent process template and a workflow environment. The workflow environment is configured to instantiate an instance of a workflow on the basis of the parent process template and according to a first workflow configuration, wherein instantiating comprises executing a number of workflow operations according to the first workflow configuration. The workflow environment is further configured to receive a change request specifying a second workflow configuration, and change the execution of the workflow operations relative to the execution of the workflow operations according to the second workflow configuration.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
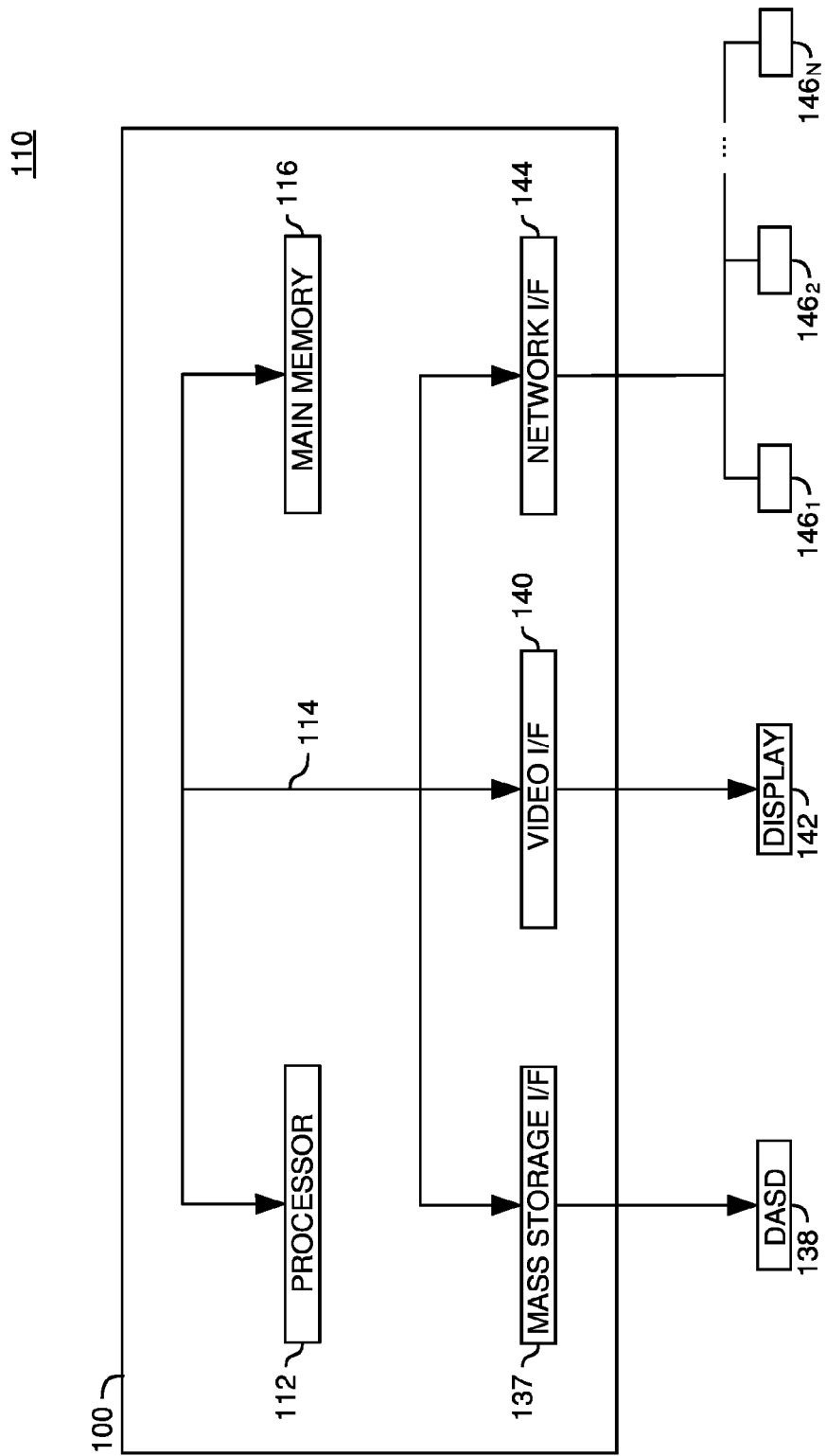
FIG. 1 is a computer system illustratively utilized in accordance with the invention.

The present invention generally is directed to a method, system and article of manufacture for workflow processing and, more particularly, for managing creation and execution of data driven dynamic workflows. A data driven workflow is a workflow that is driven by configuration data defining settings and properties that are used to tune and configure runtime behavior of the workflow. A data driven dynamic workflow according to embodiments of the present invention is a workflow where the configuration data can be modified or changed at runtime.

In one embodiment, a workflow configuration can be created that implements a structure of a set of workflow operations which need to be executed for a given workflow. Accordingly, the workflow configuration specifies dependencies between the workflow operations, allowing workflow operations to be executed in a sequence, in parallel, or in combination thereof to create a complex workflow structure.

The workflow configuration is submitted to a parent process template which instantiates an instance of the given workflow on the basis of the workflow configuration. According to one aspect, a single parent process template can be designed that generically defines the given workflow. The instance of the given workflow is implemented by a parent process, instantiated according to the parent process template, and one or more child processes which are "spawned off" of the parent process according to one ore more child process templates. One child process executes to implement individual workflow operations or a given set of operations.

In one embodiment, the parent process template allows changing the workflow configuration executed by the parent process. However, only attributes, or information specific to a particular workflow operation, and structure, or dependencies, of executing and/or scheduled workflow operations may be changed. However, completed workflow operations may not be altered.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network 148. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 118 and storage device 134 could be part of one virtual address space spanning multiple primary and secondary storage devices.

An Exemplary Workflow Environment

Figure 2A:
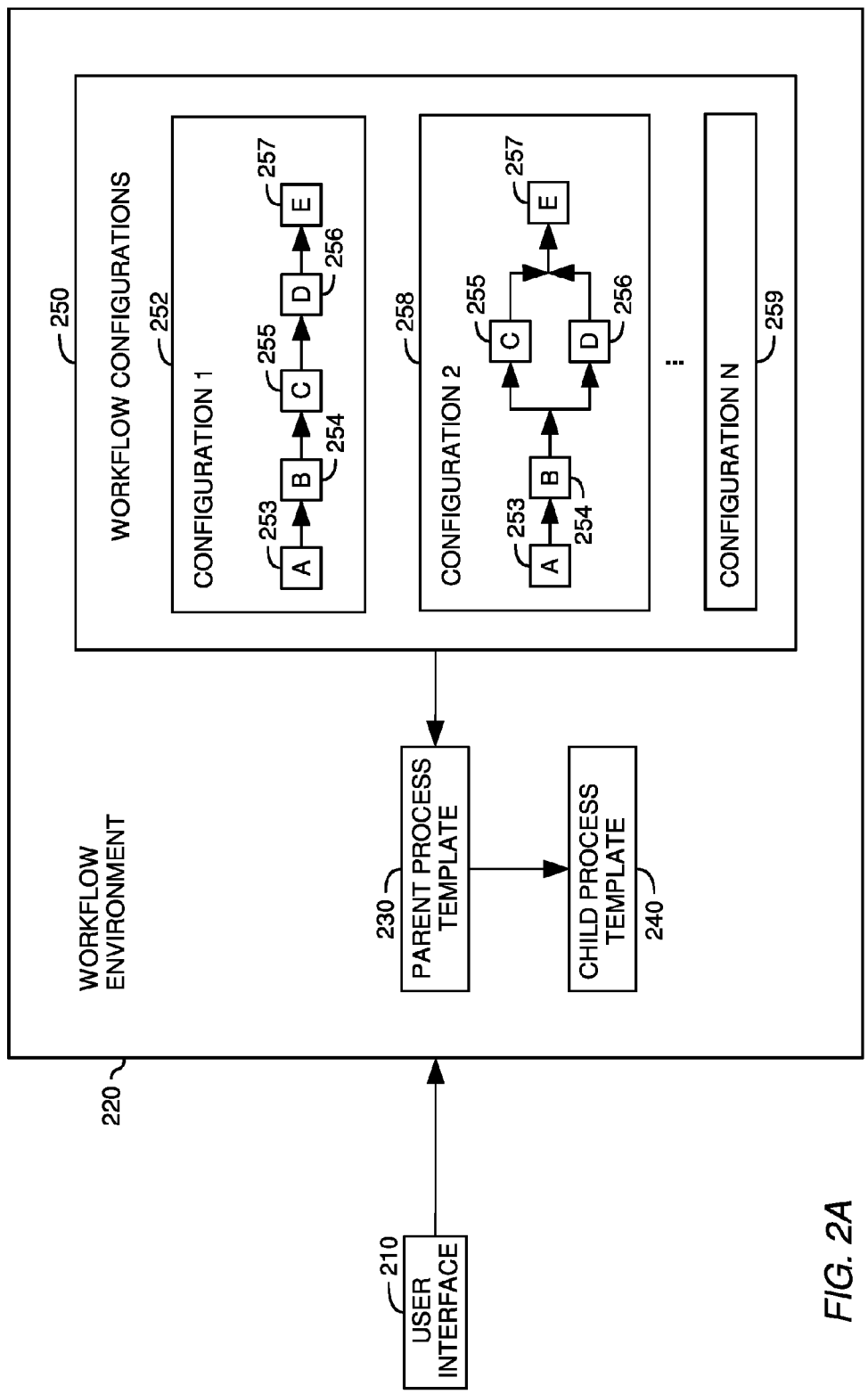
FIGS. 2A-2C are relational views of software components in one embodiment.
Figure 2B:
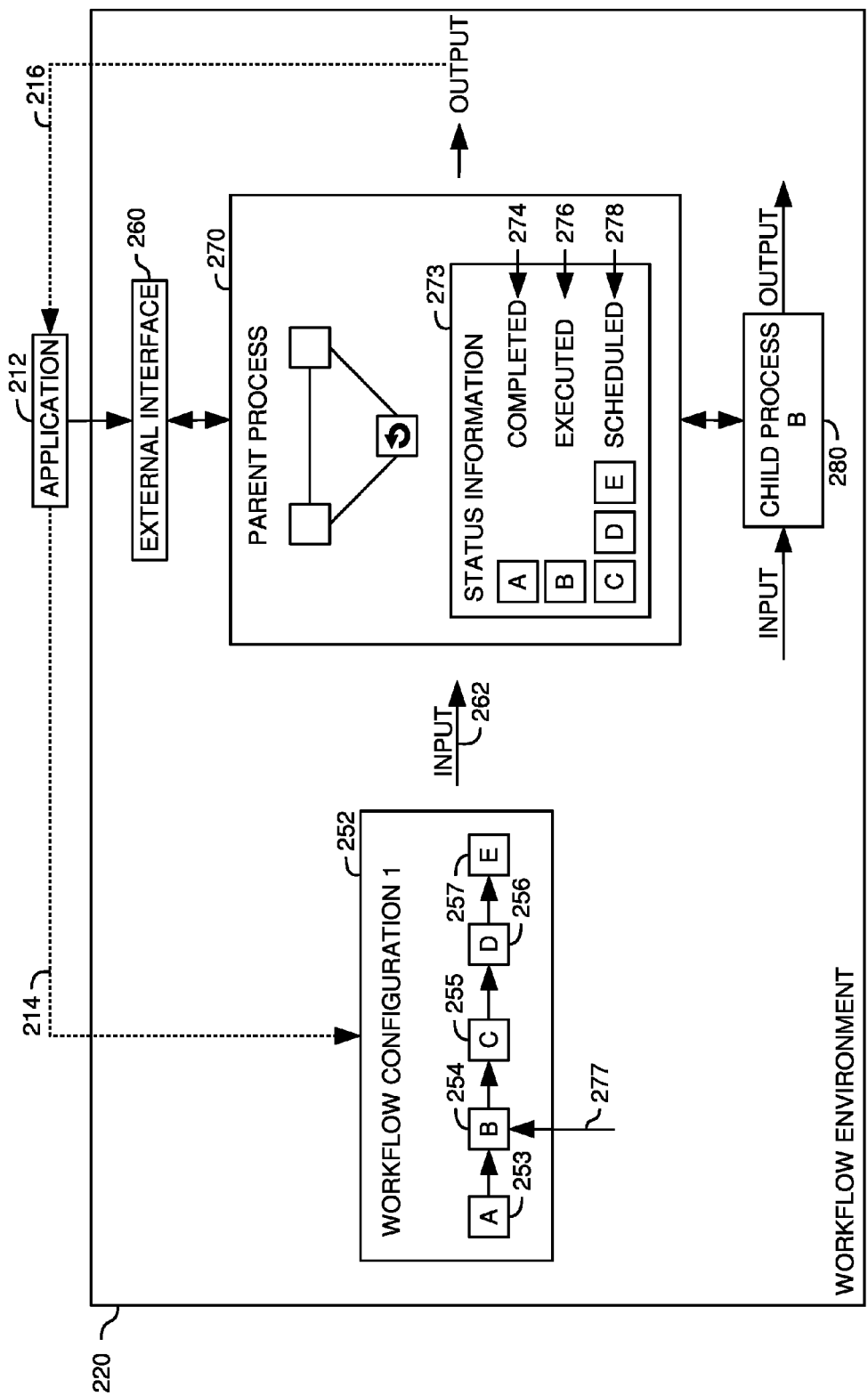
Figure 2C:
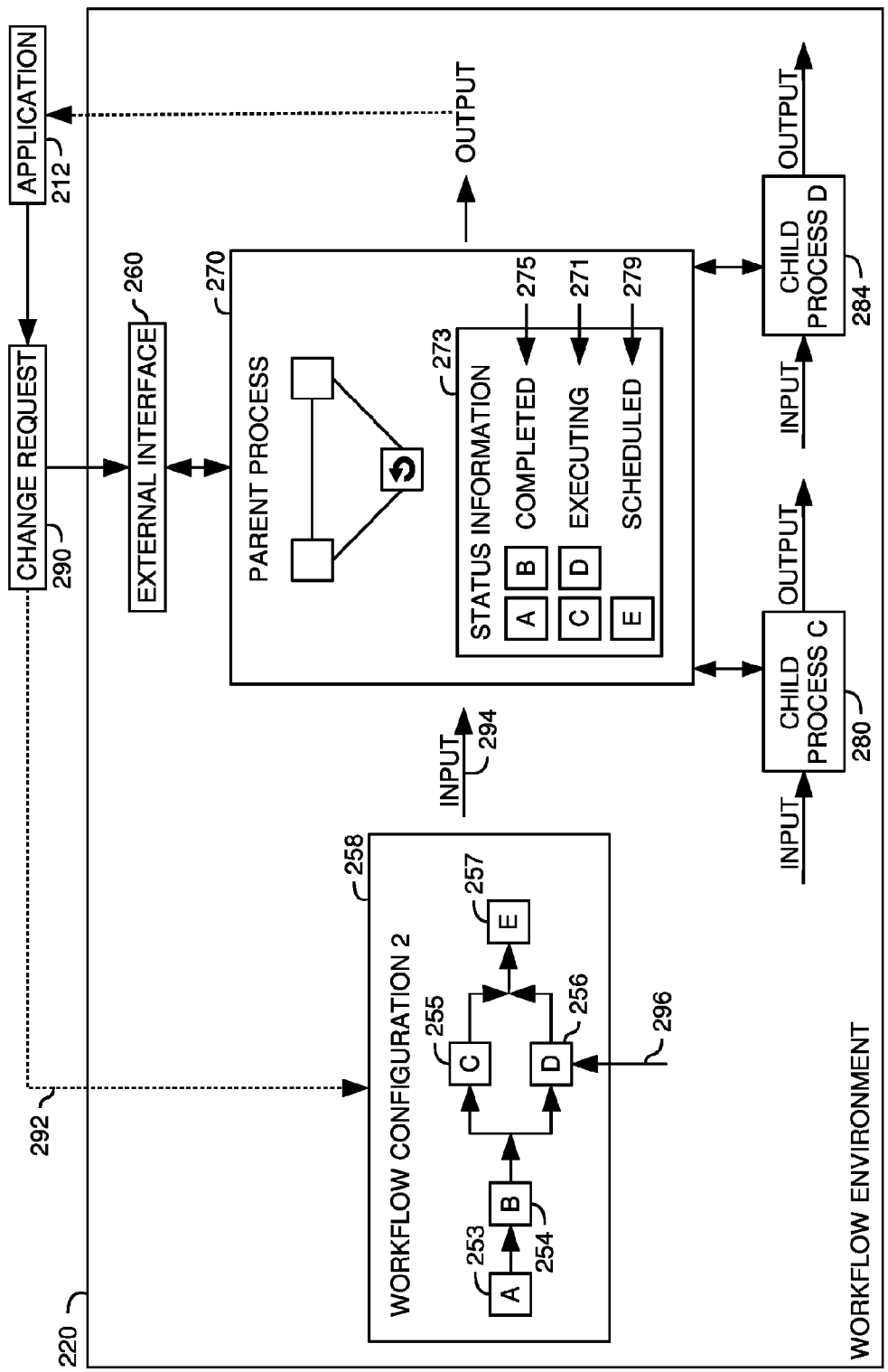

Referring now to FIGS. 2A-C, relational views of components implementing one aspect of the invention are illustrated. FIG. 2A shows an exemplary embodiment of a workflow environment in a static state, i.e., in a pre-runtime state showing all elements required to initiate and perform runtime of the workflow environment. FIGS. 2B-C show the workflow environment at runtime.

More specifically, FIG. 2A shows a user interface 210 and an exemplary workflow environment 220. The workflow environment 220 illustratively includes a parent process template 230, a child process template 240 and a plurality of workflow configurations 250. However, it should be noted that various different implementations of the workflow environment 220 are broadly contemplated. For instance, the workflow environment 220 can be implemented as a computer program accessing different components stored in memory (e.g., main memory 116 of FIG. 1). Accordingly, the parent process template 230 and the child process template 240 can be implemented as integral part of this workflow environment or can be stored separately in a local or remote memory.

By way of example, the workflow configurations 250 include three different workflow configurations 252 "WORKFLOW CONFIGURATION 1", 258 "WORKFLOW CONFIGURATION 2" and 259 "WORKFLOW CONFIGURATION N". However, it should be noted that the plural workflow configurations 252, 258 and 259 are merely shown for purposes of illustration and that, according to one aspect, only a single workflow configuration can be provided. In this case, other workflow configurations can be created as required, e.g., at runtime, as will be explained in more detail below with reference to FIG. 2C.

Each of the workflow configurations 252, 258 and 259 implements a structure of a set of underlying workflow operations which need to be executed to perform a given workflow. Accordingly, each workflow configuration specifies dependencies between the underlying workflow operations defining whether the workflow operations should be executed in a sequence, in parallel, or in combination thereof to create a more complex structure. Illustratively, the workflow configuration 252 implements a sequential structure of five workflow operations, i.e., operation 253 "A", operation 254 "B", operation 255 "C", operation 256 "D", and operation 257 "E". The workflow configuration 258 includes the same workflow operations as the workflow configuration 252. However, in contrast to the workflow configuration 252, the operation 255 "C" and the operation 256 "D" are executed in parallel according to the workflow configuration 258.

According to one aspect, each of the workflow operations 253, 254, 255, 256 and 257 describes an individual task and related attributes/information required for accomplishing the task. For instance, the workflow operation 253 "A" may be defined for sending an electronic mail to some specific user A requesting the user A to perform some action B. Exemplary workflow configurations illustrating the workflow configurations 252 and 258 in more detail are explained below with reference to FIGS. 6 and 7, respectively.

In one embodiment, the parent process template 230 receives one of the workflow configurations 250 as input in order to initiate execution of a given workflow. The parent process template 230 generically defines the given workflow and is configured to transform a received workflow configuration into an executable format. To this end, the parent process template 230 defines one or more external interfaces required by the given workflow, such as input and output messages.

The parent process template 230 instantiates an instance of the given workflow on the basis of the received workflow configuration. The instance of the given workflow executes the underlying workflow operations according to the received workflow configuration, whereby each underlying workflow operation is executed using the child template 240. Instantiating the instance of the given workflow using the parent process template 230 and the child process template 240 is described in more detail below with reference to FIGS. 2B-C.

In one embodiment, each of the workflow configurations 252, 258 and 259 can be created by one or more users using the user interface 210. According to one aspect, the user interface 210 may be a graphical user interface; however, more generally, the user interface 210 may be any suitable interface to create the workflow configurations 250. Furthermore, in particular embodiments, the user(s) can create each of the workflow configurations 252, 258 and 259 using natural language or any suitable encoding language, such as XML. Accordingly, each of the workflow configurations 252, 258 and 259 can be created in some abstract form. However, if this abstract form does not define a suitable input format for the parent process template 230, the received workflow configuration needs to be translated into the suitable input format (e.g., from natural language to XML). This translation can be performed by some translator component which receives the workflow configuration as input and provides a translated workflow configuration as output in the format required by the parent process template 230. It should be noted that various different implementations of such a translator component are broadly contemplated. For instance, the translator component can be implemented as integral part of the parent process template 230 or as a separate software component. However, for simplicity it is assumed in the following description that the parent process template 230 receives the workflow configuration in a suitable encoding language for initiation of runtime, so that no translation is required. Runtime of the workflow environment 220 is described in more detail below with reference to FIGS. 2B-C.

An Exemplary Workflow Runtime

Referring now to FIG. 2B, an exemplary relational view of components implementing constituent functions of the workflow environment 220 of FIG. 2A for execution of a given workflow is shown. By way of example, an application 212 submits, via an external interface 260, a request to the workflow environment 220 to execute the given workflow on the basis of the workflow configuration 252 "WORKFLOW CONFIGURATION 1" of FIG. 2A, as illustrated by a dashed arrow 214. The application 212 can be any suitable requesting entity including, at the highest level, end-users.

The workflow configuration 252 is submitted to the parent process template 230, as illustrated by an arrow 262, which instantiates an instance of the given workflow. More specifically, the parent process template 230 creates a parent process 270 on the basis of the workflow configuration 252 which executes the given workflow. Accordingly, the parent process 270 includes workflow logic 272 required to execute the workflow operations 253, 254, 255, 256 and 257 as defined by the workflow configuration 252.

In one embodiment, the parent process 270 spawns off one or more child processes for execution of the workflow operations 253, 254, 255, 256 and 257. More specifically, the parent process 270 instantiates the child process template 240 N times to create N child processes to execute the workflow operations 253, 254, 255, 256 and 257. In one embodiment, a child process is created for each individual workflow operation of the given workflow to be executed, e.g., N is equal to 5 according to the workflow operations 253, 254, 255, 256 and 257. Alternatively, a given child process may implement more than one workflow operation, in which case N is less than the number of the workflow operations of the given workflow to be executed.

As in the given example the workflow operations 253, 254, 255, 256 and 257 are executed in sequence according to the workflow configuration 252, the corresponding instances of the child process template 240 are created sequentially, i.e., one after another. Furthermore, the parent process 270 provides required input to each of the spawned off child processes and collects produced output therefrom. However, it should be noted that the input to a given child process is not necessarily the output of a previous child process. More specifically, in the given example the order of the workflow operations 253, 254, 255, 256 and 257 in the workflow configuration 252 is merely intended to illustrate a sequence of execution, i.e., a time line. For instance, the workflow operation "B" 254 is executed after the workflow operation 253 "A", the workflow operation 255 "C" is executed after the workflow operation 254 "B" etc. Required input to each of the workflow operations 253, 254, 255, 256 and 257 and, thus, the corresponding child processes can be specified separately from the sequence of execution by the workflow configuration 252. By way of example, assume that a given document which must be reviewed and approved is specified as the required input to all workflow operations. In other words, all workflow operations 253, 254, 255, 256 and 257 have the same input. The output of each of the workflow operations 253, 254, 255, 256 and 257 can be an approval/disapproval of the given document (e.g., "1" for approval and "0" for disapproval). The output produced by execution of an underlying workflow on the basis of such an exemplary workflow configuration can, for instance, be a final approval/disapproval or a list of collected approvals/disapprovals returned by the corresponding child processes.

In the illustrated example, a first task of the given workflow according to the workflow configuration 252 consists in execution of the workflow operation 253 "A". Accordingly, the parent process 270 initially spawns off a first child process for the workflow operation 253 "A" based on the child process template 240. When execution of the first child process is completed, the parent process 270 spawns off a second child process for the workflow operation 254 "B" based on the child process template 240. Illustratively, the parent process 270 spawns off the child process 280 "CHILD PROCESS B" for the workflow operation 254 "B". In the given example, the parent process 270 supplies required input to the first child process and executes the first child process. Then, the parent process 270 supplies required input to the child process 280 and executes the child process 280. Furthermore, the parent process 270 collects returned output from each child process which has completed execution and processes the collected output according to some predefined rules. For instance, the parent process 270 inserts each returned output into a particular output list or combines each returned output using appropriate Boolean operators. The parent process 270 continues spawning off child processes until execution of the given workflow is completed, i.e., in the given example until the workflow operation 257 "E" has been executed. The parent process 270 then returns a corresponding output obtained by the given workflow to the application 212, as indicated by a dashed arrow 216.

In one embodiment, the parent process 270 is configured to generate status information 273 indicating an execution status of each of the workflow operations 253, 254, 255, 256 and 257 of the underlying workflow configuration 252. The status information 273 can be queried by the application 212 using the external interface 260. In the illustrated example, execution of the workflow operation 253 "A" is completed and the workflow operation 254 "B" is currently executing, as illustrated by an arrow 277. Accordingly, the status information 273 includes: (i) an execution status 274 indicating that execution of the workflow operation 253 "A" is completed, (ii) an execution status 276 indicating that the workflow operation 254 "B" is currently executing (as illustrated by child process 280), and (iii) an execution status 278 indicating that execution of the workflow operations 255 "C", 256 "D" and 257 "E" is scheduled. It should be noted that the exemplary status information 273 illustratively refers to "completed", "executing" and "scheduled" states. However, other status information can also be provided, such as status attributes indicating who (i.e., which user or application) is executing the given workflow and/or status information describing dependencies between the workflow operations 253, 254, 255, 256 and 257 as defined by the workflow configuration 252. All such status information is broadly contemplated.

In one embodiment, the workflow configuration 252 can be changed during execution of the given workflow by the parent process 270. In other words, the dependencies between the underlying workflow operations and/or the underlying workflow operations themselves can be changed. For instance, instead of executing workflow operations "A", "B", "C", "D" and "E" for the given workflow according to the workflow configuration 252, workflow operations "A", "B", "F" and "G" could be executed according to another workflow configuration to obtain the requested output. According to another aspect, instead of executing all workflow operations in sequence according to the workflow configuration 252, two or more workflow operations can be performed in parallel, such as operations "C" and "D", as shown in workflow configuration 258. In other words, various changes to the workflow configuration 252 are possible, all of which are broadly contemplated. An exemplary change of the underlying workflow configuration is described in more detail in the following with reference to FIG. 2C.

In one embodiment only attributes, or information specific to a particular one of the workflow operations 253, 254, 255, 256 and 257, and structure, or dependencies, of executing and/or scheduled workflow operations may be changed. Completed workflow operations may not be altered.

Referring now to FIG. 2C, the application 212 of FIG. 2B issues a change request 290 to the external interface 260 of the workflow environment 220. The change request 290 requests the workflow environment 220 to execute or continue execution of the given workflow on the basis of the workflow configuration 258 of FIG. 2A, as illustrated by dashed arrow 292. In other words, while the parent process 270 is executing the given workflow on the basis of the workflow configuration 252 of FIG. 2B, the workflow configuration 258 is selected to replace the workflow configuration 252. The workflow configuration 258 can be retrieved from memory, where it exists as a persistent data object in one embodiment. Alternatively, the workflow configuration 258 can be created at runtime, as described above with reference to FIG. 2A.

Upon receipt of the change request 290, the workflow environment 220 performs a validation procedure in order to determine whether the workflow configuration 258 is a valid workflow configuration for the parent process 270. In one embodiment, the workflow configuration 258 is a valid workflow configuration only if the workflow configuration 258 does not require a change to one or more of the completed workflow operations of the workflow configuration that should be replaced, i.e., the workflow configuration 252. Accordingly, the validation procedure includes identifying all completed workflow operations of the workflow configuration 252.

In the given example, the completed workflow operations of the workflow configuration 252 can be identified from the status information 273 of FIG. 2B, as described above. Accordingly, only execution of the workflow operation 253 "A" is completed and the workflow operation 254 "B" is executing. As the workflow configuration 258 does not require a change to the workflow operation 253, the workflow configuration 258 is a valid workflow configuration for the parent process 270. Accordingly, the workflow configuration 252 can be replaced with the workflow configuration 258, as described in more detail below with reference to FIGS. 3-5. In one embodiment, replacing the workflow configuration 252 with the workflow configuration 258 includes using the workflow configuration 258 as input to the parent process 270 instead of the workflow configuration 252, as illustrated by an arrow 294.

After replacing the workflow configuration 252 with the workflow configuration 258, the parent process 270 continues execution on the basis of the workflow configuration 258. Thus, when execution of the child process 280 of FIG. 2B for the workflow operation 254 "B" is completed, the parent process 270 spawns off a child process 282 "CHILD PROCESS C" for the workflow operation 255 "C". As the workflow operation 255 "C" should be performed in parallel with the workflow operation 256 "D" according to the workflow configuration 258, the parent process 270 also spawns off a child process 284 "CHILD PROCESS D" for the workflow operation 256 "D". Both child processes 282 and 284 are executed in parallel, i.e., simultaneously. To this end, the parent process 270 supplies appropriate input to each one of the child processes 282 and 284 and collects the output thereof.

While execution of the given workflow by the parent process 270 is progressing, the status information 273 provided by the parent process 270 is continuously updated. As indicated by an arrow 296 and described above, in the example illustrated in FIG. 2C the workflow operations 255 "C" and 256 "D" are executing. Accordingly, the status information 273 now includes: (i) an execution status 275 indicating that execution of the workflow operations 253 "A" and 254 "B" is completed, (ii) an execution status 271 indicating that the workflow operations 255 "C" and 256 "D" are currently executing (as illustrated by child processes 282 and 284), and (iii) an execution status 279 indicating that execution of the workflow operation 257 "E" is scheduled.

Managing Execution of Workflow Instances

Figure 3:
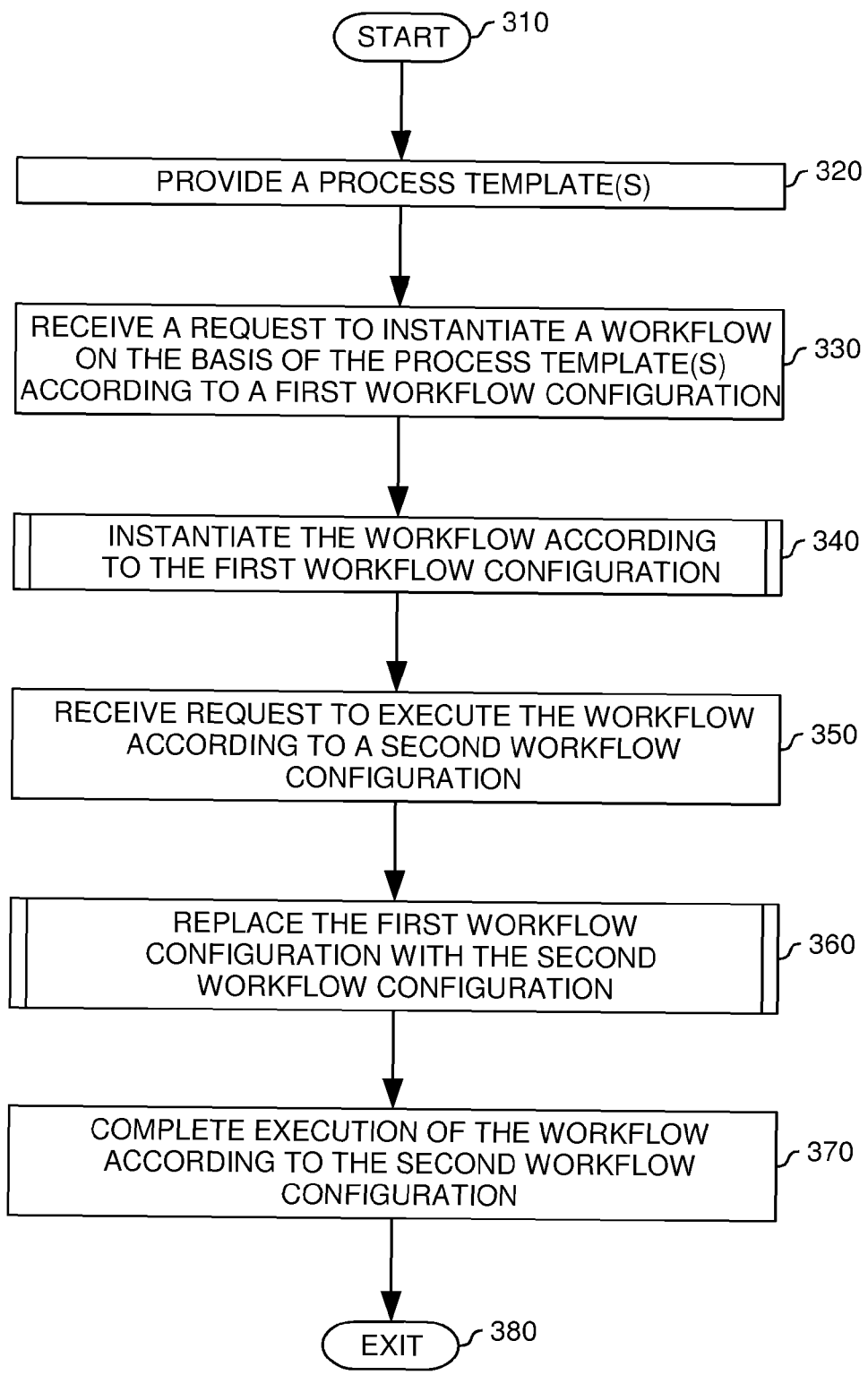
FIG. 3 is a flow chart illustrating workflow execution management in one embodiment.

Referring now to FIG. 3, an exemplary method 300 for managing execution of workflow instances (e.g., parent process 270 and child processes 280, 282 and 284 of FIG. 2) is shown. At least part of the steps of method 300 may be performed in a suitable workflow environment (e.g., workflow environment 220 of FIG. 2). The method 300 starts at step 310.

At step 320, a process template(s) is provided. Providing a process template(s) includes providing a parent process template (e.g., parent process template 230 of FIG. 2A) and a child process template (e.g., child process template 240 of FIG. 2A). In one embodiment, the parent and child process templates are stored in memory (e.g., main memory 116 of FIG. 1) as persistent data objects. For instance, a workflow developer with appropriate workflow and programming skills designs the parent and child process templates to implement a given workflow and stores them as persistent data objects. The persistent data objects are accessible by the suitable workflow environment to allow instantiation of an instance(s) of the given workflow.

At step 330, a request for instantiation of an instance of the given workflow on the basis of the parent process template (e.g., parent process template 230 of FIG. 2A) is received. Specifically, instantiation of the instance according to a first workflow configuration (e.g., workflow configuration 252 of FIG. 2B) is requested. In one embodiment, the instantiation is requested by a suitable application (e.g., application 212 of FIG. 2) using an external interface (e.g., external interface 260 of FIG. 2) of the suitable workflow environment.

At step 340, the instance of the given workflow according to the first workflow configuration is created. An exemplary method for creation of the instance of the given workflow is described below with reference to FIG. 4.

At step 350, a change request (e.g., change request 290 of FIG. 2C) is received. The change request requests to replace during execution of the given workflow the first workflow configuration with a second workflow configuration (e.g., workflow configuration 258 of FIG. 2C). In one embodiment, the change request is received from the suitable application using the external interface of the suitable workflow environment.

At step 360, the first workflow configuration is replaced with the second workflow configuration. An exemplary method for replacing the first workflow configuration with the second workflow configuration is described below with reference to FIG. 5.

At step 370, execution of the given workflow is completed according to the second workflow configuration. Execution of the given workflow according to the second workflow configuration may at least in part be performed as described below with reference to FIG. 4. Processing then exits at step 380.

Figure 4:
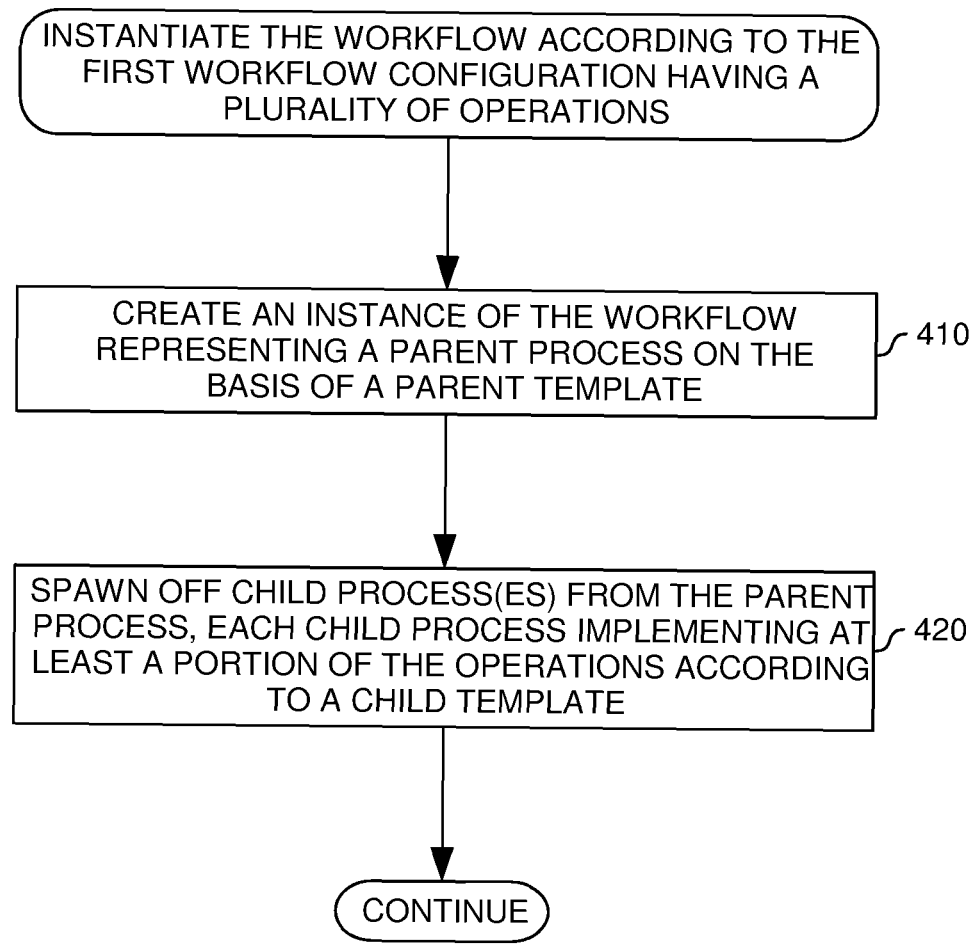
FIG. 4 is a flow chart illustrating instantiation of a workflow instance in one embodiment.

Referring now to FIG. 4, an exemplary method for creating the instance of the given workflow according to step 340 of the method 300 of FIG. 3 is shown. At least part of the steps of method 400 may be performed in a suitable workflow environment (e.g., workflow environment 220 of FIG. 2).

Method 400 starts at step 410, where a parent process (e.g., parent process 270 of FIG. 2B) is created on the basis of the parent process template. In one embodiment, the parent process represents an executing instance of the given workflow.

At step 420, the parent process spawns off a child process (es). Each child process represents an executing instance of one or more of the workflow operations defined by the underlying workflow configuration. Accordingly, independent of whether the given workflow is executed on the basis of the first or second workflow configuration, corresponding child processes are spawned of for execution of the respective underlying workflow operations. Processing then continues at step 350 of FIG. 3.

Figure 5:
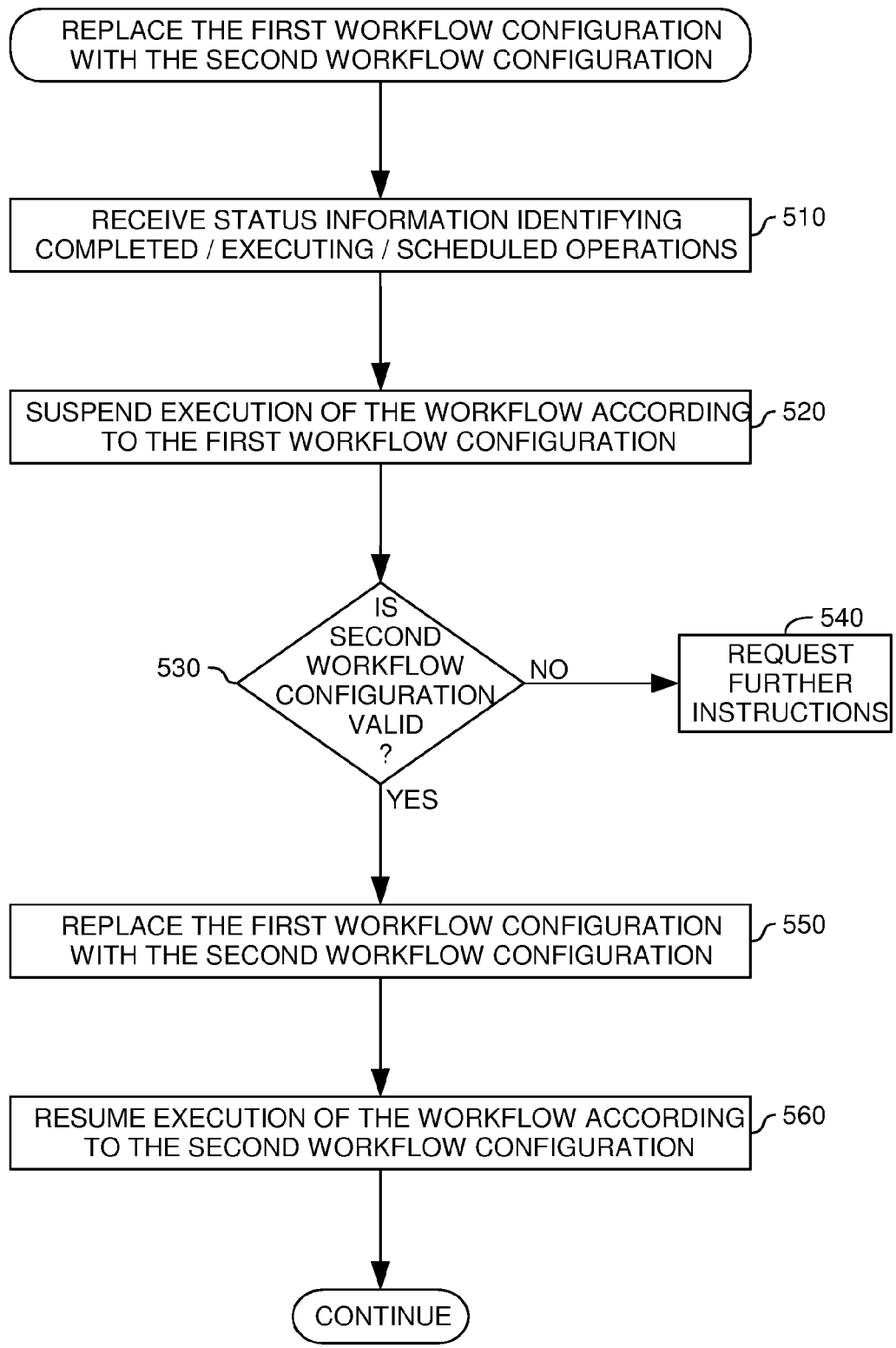
FIG. 5 is a flow chart illustrating management of a workflow configuration change in one embodiment.

Referring now to FIG. 5, an exemplary method 500 for replacing the first workflow configuration with the second workflow configuration according to step 360 of the method 300 of FIG. 3 is shown. At least part of the steps of method 500 may be performed in a suitable workflow environment (e.g., workflow environment 220 of FIG. 2).

Method 500 starts at step 510, where status information (e.g., status information 273 of FIG. 2B) is received. In one embodiment, the status information is queried by the suitable application using the external interface of the suitable workflow environment. Accordingly, the application receives the status information from the workflow environment. As was noted above, the status information is suitable to identify completed, executing and scheduled workflow operations of the first workflow configuration.

At step 520, execution of the given workflow according to the first workflow configuration is suspended. At step 530, a validation procedure is performed to determine whether the second workflow configuration is a valid workflow configuration. As was noted above, the validation procedure includes identifying all completed workflow operations of the first workflow configuration. In one embodiment, the second workflow configuration is only valid if no change to one or more completed workflow operations of the first workflow configuration is required.

If the second workflow configuration is not valid, further instructions are requested from the suitable application via the external interface at step 540. According to one aspect, requesting further instructions includes notifying a user that the second workflow configuration is not valid and prompting the user to indicate whether execution of the given workflow should be completed on the basis of the first workflow configuration. Alternatively, execution of the given workflow according to the first workflow configuration can automatically be resumed and completed. Still alternatively, execution of the given workflow according to the first workflow configuration can be terminated while requesting the suitable application to provide a valid second workflow configuration. All such implementations are broadly contemplated.

If, however, the second workflow configuration is a valid workflow configuration, the first workflow configuration is replaced with the second workflow configuration at step 550. As was noted above, replacing the first workflow configuration with the second workflow configuration includes using the second workflow configuration as input to the parent process instead of the first workflow configuration.

Accordingly, at step 560 execution of the given workflow is resumed. More specifically, the parent process continues execution on the basis of the second workflow configuration. Processing then continues at step 370 of FIG. 3.

Exemplary Workflow Configurations

Figure 6:
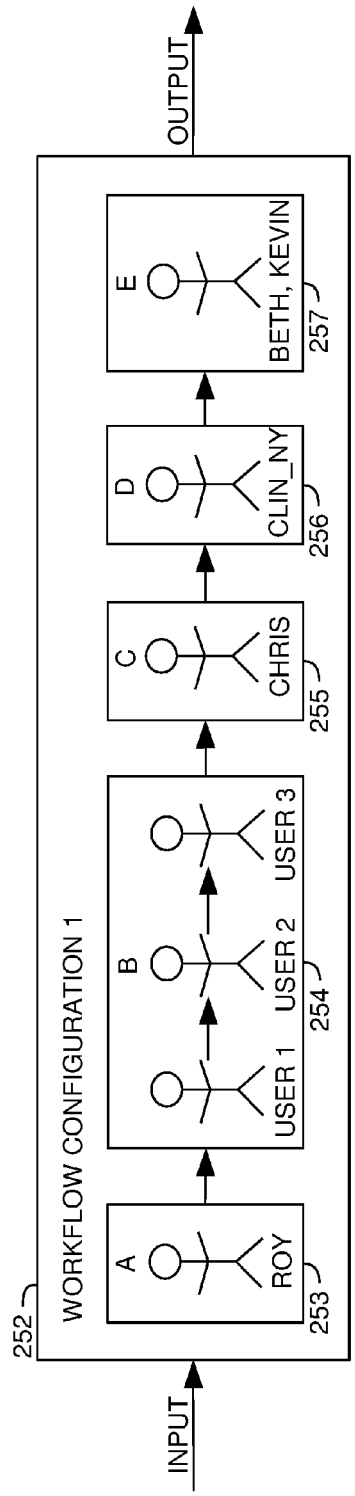
FIGS. 6-7 illustrate exemplary workflow configurations in one embodiment.

Referring now to FIG. 6, the workflow configuration 252 of FIG. 2 is illustrated in more detail by way of example. The exemplary workflow configuration 252 illustratively defines a document routing procedure in a quality assurance (QA) environment. For instance, assume that the workflow configuration 252 receives as input one or more QA documents which need to be approved by a plurality of users. Furthermore, the exemplary workflow configuration 252 is configured to provide as output an approval/disapproval with respect to the received QA document(s).

In the illustrated example, the QA document(s) is initially sent to a user "Roy" who performs some action defining the workflow operation 253 "A" of the exemplary workflow configuration 252. For instance, the user "Roy" should review the QA document(s) in order to determine whether the QA document(s) satisfies particular formal requirements and, if so, approve it. After approval, the user "Roy" should send the QA document(s) to a group of users consisting of "user1", "user2" and "user3".

Assume now that the group of users establishes a QA department. Assume further that each time a given set of QA documents is received by the QA department three members of the QA department are arbitrarily selected for review thereof These three members should review the given set of QA documents in order to determine whether the given set of QA documents satisfies specific QA requirements. Accordingly, these members of the QA department perform some action defining the workflow operation 254 "B". For instance, "user1" should review the QA document(s), approve it and transmit it to "user2". Then, "user2" should review the QA document(s), approve it and transmit it to "user3". Finally, "user3" should review the QA document(s) and approve it. After approval by "user1", "user2" and "user3", the QA department should send the QA document(s) to a user "Chris".

The user "Chris" performs some action defining the workflow operation 255 "C". For instance, assume that the user "Chris" is the leader of the QA department and should review the QA document(s) in order to determine whether approval of the QA document(s) by the users "user1", "user2" and "user3" has been performed using appropriate QA decision tools and, if so, approve the QA document(s). After approval, the user "Chris" should send the QA document(s) to a user "clin_ny".

The user "clin_ny" performs some action defining the workflow operation 256 "D". For instance, assume that the user "clin_ny" is the leader of a technical department for which the QA document(s) has been created. Accordingly, the user "clin_ny" should review the QA document(s) in order to determine whether the technical context of this technical department is correctly reflected in the QA document(s) and, if so, approve it. After approval, the user "clin_ny" should send the QA document(s) to users "Beth" and "Kevin".

Illustratively, the users "Beth" and "Kevin" perform some action defining the workflow operation 257 "E". For instance, the users "Beth" and "Kevin" are managers who should review the QA document(s) for final approval. After approval by the users "Beth" and "Kevin", the approval procedure defined by the exemplary workflow configuration 252 is completed and the output specifying a final approval is returned.

However, it should be noted that various different implementations of the workflow operations 253, 254, 255, 256 and 257 and the structure of the exemplary workflow configuration 252 are possible. For instance, if the user "Roy" disapproves in the workflow operation 253 "A" the received QA document(s), the document routing procedure, i.e., execution of the workflow according to the workflow configuration 252, can be terminated and the disapproval is returned as output. Alternatively, a list of approvals/disapprovals can be returned as output. In other words, the exemplary workflow configuration 252 is merely described by way of example and is not intended to limit workflow operations and structures of workflow configurations to any specific type of operation/structure.

Figure 7:
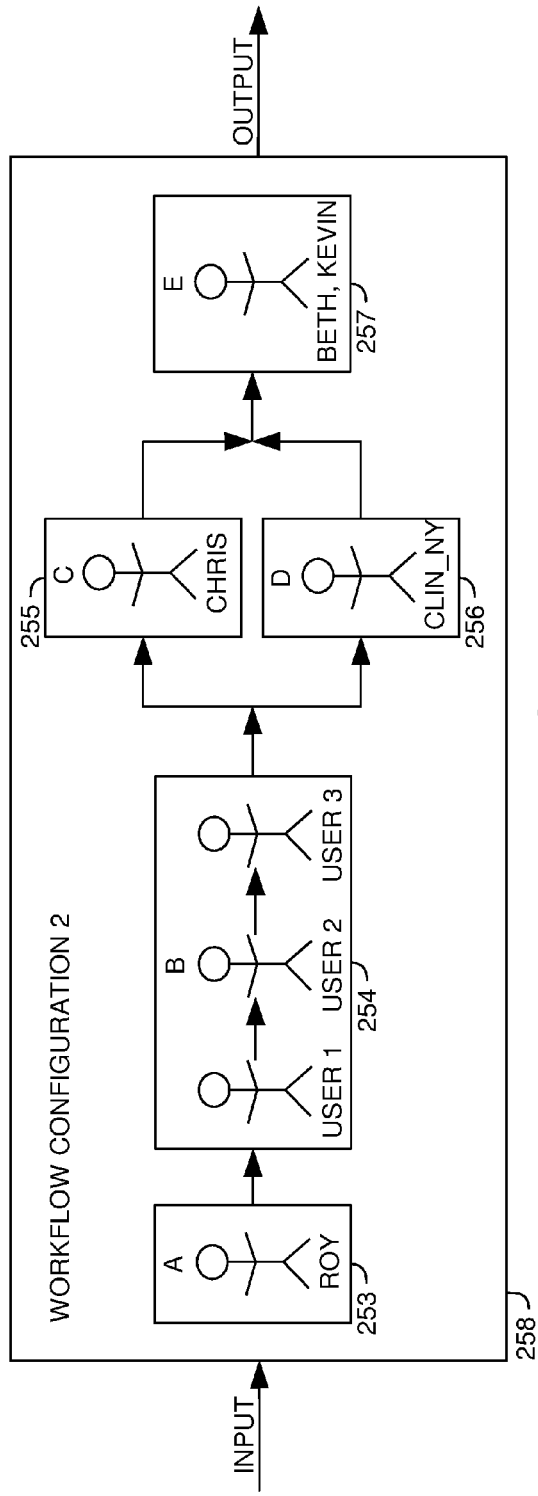

Referring now to FIG. 7, the workflow configuration 258 of FIG. 2 is illustrated in more detail by way of example. As was noted above, the exemplary workflow configuration 258 includes the same workflow operations as the exemplary workflow configuration 252 of FIGS. 2 and 6. However, according to FIG. 7 the workflow operations 255 "C" and 256 "D" are executed in parallel. In other words, according to the exemplary workflow configuration 258 the QA document(s) is transmitted simultaneously from the QA department to the users "Chris" and "clin_ny" for approval/disapproval.

As was noted above, the workflow configuration 258 can be used to replace another workflow configuration. For instance, assume that the workflow configuration 258 is submitted in order to replace the workflow configuration 252 of FIG. 6, as was described above with reference to FIG. 2C. By way of example, the user "Kevin" of FIG. 6 may want to accelerate the document routing procedure implemented by the workflow configuration 252 and, therefore, submits a change request (e.g., change request 290 of FIG. 2C) via a suitable application (e.g., application 212 of FIG. 2C) to an underlying workflow environment (e.g., workflow environment 220 of FIG. 2C).

As was noted above with reference to FIG. 2C, while the workflow operation 254 "B" is executing according to the workflow configuration 252, the workflow configuration 252 can be replaced with the workflow configuration 258. However, assume now that execution of the workflow operation 254 "B" has already completed and that the workflow operation 255 "C" is executing. In this case, the workflow configuration 252 can still be replaced with the workflow configuration 258 as the workflow operations 255 "C" and 256 "D" may still be executed in parallel (at least to some extent). However, when execution of the workflow operation 255 "C" is completed, the workflow operation 255 "C" can no longer be executed in parallel with the workflow operation 256 "D". Accordingly, in this case the workflow configuration 252 can no longer be replaced with the workflow configuration 258. This also applies when workflow operations 256 "D" and 257 "E" are executing.

Conclusion

In various embodiments, the invention provides numerous advantages over the prior art. For instance, according to embodiments of the invention a reduced skill set is required to configure a given workflow, as compared to the traditional workflow skill sets. New workflow configurations can be created and used without requiring application server maintenance to remove and deploy existing and executing workflows based on static workflow templates, i.e., static workflow definitions. According to aspects of the invention, an executing instance of the given workflow can be changed dynamically from an initially used workflow configuration to a new workflow configuration.

While the foregoing is directed to embodiments of the present invention, other and further embodiments of the invention may be devised without departing from the basic scope thereof, and the scope thereof is determined by the claims that follow.

What is claimed is:

1. A computer-implemented method to improve reconfigurability and uptime of an application server when managing workflow instances having variable runtime dependencies between workflow operations, by managing the workflow instances without requiring any application server maintenance for removing, redefining, and redeploying any workflow based on static workflow templates, the computer-implemented method comprising:

instantiating, by the application server, a parent process comprising an instance of a workflow, based on a parent process template, the workflow having variable runtime dependencies between workflow operations;

commencing, by the parent process, execution of a number of workflow operations according to an active workflow configuration of the parent process, the active workflow configuration comprising a first workflow configuration;

instantiating, by the parent process and based on a child process template distinct from the parent process template, one or more child processes each configured to execute a respective one or more workflow operations specified in the active workflow configuration;

subsequent to instantiating the instance of the workflow according to the first workflow configuration, receiving, by the application server and from a requesting entity, a change request specifying a second workflow configuration distinct from the first workflow configuration in terms of runtime dependencies between the workflow operations;

upon determining, by the application server, that the second workflow configuration is a valid workflow configuration, changing the execution of the workflow operations mid-execution by the application server, based on the second workflow configuration and by operation of one or more computer processors, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and outputting, to the requesting entity, an indication that the execution of the workflow operations has been changed mid-execution based on the second workflow configuration.

2. The computer-implemented method of claim 1, further comprising:

determining whether the second workflow configuration is a valid workflow configuration, wherein changing the execution is only performed if the second workflow configuration is determined to be valid.

3. The computer-implemented method of claim 2, wherein determining whether the second workflow configuration is a valid workflow configuration comprises identifying all completed and executing workflow operations of the first workflow configuration; wherein the second workflow configuration is a valid workflow configuration only if the second workflow configuration is not requesting a change to one or more of the completed or executing workflow operations.

4. The computer-implemented method of claim 1, wherein the first workflow configuration defines a first order of execution of a number of workflow operations and the second workflow configuration defines a second order of execution of the number of workflow operations.

5. The computer-implemented method of claim 1, further comprising:

receiving a request for status information describing an execution status of the execution of the workflow operations; and outputting the requested status information.

6. The computer-implemented method of claim 5, wherein the status information indicates one or more of:

(i) completed workflow operations;
(ii) currently executing workflow operations; and
(iii) scheduled workflow operations.

7. The computer-implemented method of claim 1, wherein instantiating the instance of the workflow on the basis of the parent process template comprises instantiating, by the parent process template, one or more child processes each configured to execute a portion of the workflow.

8. The computer-implemented method of claim 7, wherein the child processes are instantiated on the basis of a child process template defined as persistent, static object.

9. A non-transitory computer-readable medium containing a program for an application server and that, when executed performs operations to improve reconfigurability and uptime of the application server when managing workflow instances having variable runtime dependencies between workflow operations, by managing the workflow instances without requiring any application server maintenance for removing, redefining, and redeploying any workflow based on static workflow templates, the operations comprising:

instantiating, by the application server, a parent process comprising an instance of a workflow, based on a parent process template, the workflow having variable runtime dependencies between workflow operations;

commencing, by the parent process, execution of a number of workflow operations according to an active workflow configuration of the parent process, the active workflow configuration comprising a first workflow configuration;

instantiating, by the parent process and based on a child process template distinct from the parent process template, one or more child processes each configured to execute a one or more workflow operations specified in the active workflow configuration;

subsequent to instantiating the instance of the workflow according to the first workflow configuration, receiving, by the application server and from a requesting entity, a change request specifying a second workflow configuration distinct from the first workflow configuration in terms of runtime dependencies between the workflow operations;

upon determining, by the application server, that the second workflow configuration is a valid workflow configuration, changing the execution of the workflow operations mid-execution by the application server, based on the second workflow configuration and by operation of one or more computer processors when executing the program, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and outputting, to the requesting entity, an indication that the execution of the workflow operations has been changed mid-execution based on the second workflow configuration.

10. The computer-implemented method of claim 9, wherein instantiating the instance of the workflow on the basis of the parent process template comprises instantiating, by the parent process template, one or more child processes each configured to execute a portion of the workflow, wherein the child processes are instantiated on the basis of a child process template defined as persistent, static object, wherein the status information indicates: (i) completed workflow operations; (ii) currently executing workflow operations; and (iii) scheduled workflow operations;

wherein the workflow is reconfigured during execution of the workflow, in order to alter execution of the workflow, responsive to the change request, wherein reconfiguring the workflow comprises changing the workflow to execute a number of workflow operations different from the given number of workflow operations defined by the workflow configuration.

11. The computer-implemented method of claim 10, wherein the computer-implemented method further comprises:

providing the child process template, which is configured to implement an arbitrary number of workflow operations for the instance of the workflow, wherein the parent process template is configured to instantiate child processes on the basis of the child process template to implement the workflow;

wherein the first workflow configuration defines a specified order of execution of the number of workflow operations, wherein reconfiguring the workflow comprises changing the workflow to effect a different order of execution of the given number of workflow operations, wherein the status information indicating currently executing workflow operations indicates a completion status of at least a portion of the currently executing workflow operations, wherein at least one of the first and second workflow configurations are defined as operations including parallel operations, wherein at least one of the first and second workflow configurations are defined as operations including sequential operations.

12. A system to improve reconfigurability and uptime of an application server when managing workflow instances having variable runtime dependencies between workflow operations, by managing the workflow instances without requiring any application server maintenance for removing, redefining, and redeploying any workflow based on static workflow templates, the system comprising:

one or more computer processors;

a plurality of distinct templates including a parent process template and a child process template; and a workflow environment provided by program code when executed by the one or more computer processors, the program code configured to:

instantiate, by the application server, a parent process comprising an instance of a workflow, based on the parent process template, the workflow having variable runtime dependencies between workflow operations;

commencing, by the parent process, execution of a number of workflow operations according to an active workflow configuration of the parent process, the active workflow configuration comprising a first workflow configuration;

instantiating, by the parent process and based on the child process template, one or more child processes each configured to execute a respective one or more workflow operations specified in the active workflow configuration;

subsequent to instantiating the instance of the workflow according to the first workflow configuration, receive, by the application server and from a requesting entity, a change request specifying a second workflow configuration distinct from the first workflow configuration in terms of runtime dependencies between the workflow operations;

upon determining, by the application server, that the second workflow configuration is a valid workflow configuration, change the execution of the workflow operations mid-execution, by the application server and based on the second workflow configuration, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and output, to the requesting entity, an indication that the execution of the workflow operations has been changed mid-execution based on the second workflow configuration.

13. The non-transitory computer-readable medium of claim 12, wherein the operations further comprise:

determining whether the second workflow configuration is a valid workflow configuration, wherein changing the execution is only performed if the second workflow configuration is determined to be valid.

14. The non-transitory computer-readable medium of claim 12, wherein the first workflow configuration defines a first order of execution of a number of workflow operations and the second workflow configuration defines a second order of execution of the number of workflow operations.

15. A system for managing execution of workflow instances, comprising:
one or more computer processors;
a parent process template; and
a workflow environment configured to:
instantiate an instance of a workflow on the basis of the parent process template and according to a first workflow configuration, wherein instantiating comprises executing a number of workflow operations according to the first workflow configuration;
receive a change request specifying a second workflow configuration; and
change the execution of the workflow operations, based on the second workflow configuration and by operation of the one or more computer processors, including replacing the first workflow configuration with the second workflow configuration, wherein at least one workflow operation, selected from a currently executing workflow operation and a workflow operation scheduled to be executed, is replaced on the basis of the second workflow configuration.

16. The system of claim 15, wherein the workflow environment is further configured to:
determining whether the second workflow configuration is a valid workflow configuration, wherein changing the execution is only performed if the second workflow configuration is determined to be valid.

17. The system of claim 15, wherein the first workflow configuration defines a first order of execution of a number of workflow operations and the second workflow configuration defines a second order of execution of the number of workflow operations.

18. A computer-implemented method to improve reconfigurability and uptime of an application server when managing workflow instances having variable runtime dependencies between workflow operations, by managing the workflow instances without requiring any application server maintenance for removing, redefining, and redeploying any workflow based on static workflow templates, the computer-implemented method comprising:
instantiating, by the application server, a parent process comprising an instance of a workflow, based on a parent process template, the workflow having variable runtime dependencies between workflow operations;
commencing, by the parent process, execution of a number of workflow operations according to an active workflow configuration of the parent process, the active workflow configuration comprising a first workflow configuration;
instantiating, by the parent process and based on a child process template distinct from the parent process template, one or more child processes each configured to execute a respective one or more workflow operations specified in the active workflow configuration;
subsequent to instantiating the instance of the workflow according to the first workflow configuration, receiving, by the application server and from a requesting entity, a change request specifying a second workflow configuration distinct from the first workflow configuration in terms of runtime dependencies between the workflow operations;
determining, by the application server, that the second workflow configuration is a valid workflow configuration, comprising identifying all completed and executing workflow operations of the first workflow configuration, wherein the second workflow configuration is a valid workflow configuration only if the second workflow configuration is not requesting a change to one or more of the completed or executing workflow operations;
upon determining that the second workflow configuration is a valid workflow configuration, changing the execution of the workflow operations mid-execution by the application server, based on the second workflow configuration and by operation of one or more computer processors, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and
outputting, to the requesting entity, an indication that the execution of the workflow operations has been changed mid-execution based on the second workflow configuration.

19. A non-transitory computer-readable medium containing a program for an application server and that, when executed, performs operations to improve reconfigurability and uptime of the application server when managing workflow instances having variable runtime dependencies between workflow operations, by managing the workflow instances without requiring any application server maintenance for removing, redefining, and redeploying any workflow based on static workflow templates, the operations comprising:
instantiating, by the application server, a parent process comprising an instance of a workflow, based on a parent process template, the workflow having variable runtime dependencies between workflow operations;
commencing, by the parent process, execution of a number of workflow operations according to an active workflow configuration of the parent process, the active workflow configuration comprising a first workflow configuration;
instantiating, by the parent process and based on a child process template distinct from the parent process template, one or more child processes each configured to execute a respective one or more workflow operations specified in the active workflow configuration;
subsequent to instantiating the instance of the workflow according to the first workflow configuration, receiving, by the application server and from a requesting entity, a change request specifying a second workflow configuration distinct from the first workflow configuration in terms of runtime dependencies between the workflow operations;
determining, by the application server, that the second workflow configuration is a valid workflow configuration, comprising identifying all completed and executing workflow operations of the first workflow configuration, wherein the second workflow configuration is a valid workflow configuration only if the second workflow configuration is not requesting a change to one or more of the completed or executing workflow operations;
upon determining that the second workflow configuration is a valid workflow configuration, changing the execution of the workflow operations mid-execution by the application server, based on the second workflow configuration and by operation of one or more computer processors when executing the program, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and outputting, to the requesting entity, an indication that the execution of the workflow operations has been changed mid-execution based on the second workflow configuration.

20. A system to improve reconfigurability and uptime of an application server when managing workflow instances having variable runtime dependencies between workflow operations, by managing the workflow instances without requiring any application server maintenance for removing, redefining, and redeploying any workflow based on static workflow templates, the system comprising:

one or more computer processors;

a plurality of distinct templates including a parent process template and a child process template; and a workflow environment provided by program code when executed by the one or more computer processors, the program code configured to:

instantiate, by the application server, a parent process comprising an instance of a workflow, based on a parent process template, the workflow having variable runtime dependencies between workflow operations;

commence, by the parent process, execution of a number of workflow operations according to an active workflow configuration of the parent process, the active workflow configuration comprising a first workflow configuration;

instantiate, by the parent process and based on a child process template distinct from the parent process template, one or more child processes each configured to execute a respective one or more workflow operations specified in the active workflow configuration;

subsequent to instantiating the instance of the workflow according to the first workflow configuration, receive, by the application server and from a requesting entity, a change request specifying a second workflow configuration distinct from the first workflow configuration in terms of runtime dependencies between the workflow operations;

determine, by the application server, that the second workflow configuration is a valid workflow configuration, comprising identifying all completed and executing workflow operations of the first workflow configuration, wherein the second workflow configuration is a valid workflow configuration only if the second workflow configuration is not requesting a change to one or more of the completed or executing workflow operations;

upon determining that the second workflow configuration is a valid workflow configuration, change the execution of the workflow operations mid-execution, by the application server and based on the second workflow configuration, including replacing the first workflow configuration with the second workflow configuration as the active workflow configuration for the parent process, and without requiring any application server maintenance for removing, redefining, and redeploying the workflow based on static workflow templates, thereby improving the reconfigurability and uptime of the application server; and output, to the requesting entity, an indication that the execution of the workflow operations has been changed mid-execution based on the second workflow configuration.

* * * * *